ations, although if the reagents are mixed at a tem-
United States Patent Office 2,923,732
Patented Feb. 2, 1960

2,923,732
PROCESS FOR MAKING QUINITOL BIS-CHLOROFORMATE

Frederick H. Norton, Concord, Calif., assignor to The Dow Chemical Company, Midland, Mich., a corporation of Delaware No Drawing. Application May 20, 1957
Serial No. 660,052

3 Claims. (Cl. 260—463)

This invention relates to processes for making the bis-chloroformate of trans-quinitol (trans-1,4-cyclohexanediol).

Trans-quinitol is well known as a diol which is relatively inactive toward phosgene; consequently, the preparation of its bis-chloroformate by conventional methods is unsatisfactory.

The chloroformates of such sluggish alcohols are sometimes prepared by use of phosgene in the presense of an amine catalyst. While such catalysts accelerate the formation of chloroformates, they contaminate the product and are extremely difficult to remove therefrom.

According to the invention, trans-quinitol is reacted with phosgene at a low temperature and in the absence of amine or other catalysts to produce the bis-chloroformate in high yield and purity by using a large excess of phosgene and conducting the reaction in a ketone.

While theoretically only two molar equivalents of phosgene are required for complete reaction, it has been found that a higher yield and purity of product is obtained if at least 3, and preferably 4 to 6 molar equivalents are used. Even more may be used, of course, but the benefit of using more than about 6 moles is quite small and does not justify the added expense.

The volume of ketone used should be at least equal to the volume of the combined reagents and may advantageously be 2 to 5 times that volume. Here too, however, the increase in cost due to the use of large volumes of solvent soon out-weighs the advantages; hence the preferred volume is about 1 to 4 times the volume of the reagents.

It is preferred that the reagents be mixed at a temperature of about 0 to 20° C. Later, the temperature may be raised to 40–60° to complete the reaction, though it should not exceed 60–65° because of danger of decomposing some of the product. A preferred procedure is to mix the reagents and the ketone at a temperature below 8° C. so that the phosgene can be handled in liquid form at atmospheric pressure. The temperature can then be raised to 10–20° without the phosgene boiling excessively. As the reaction proceeds, the mixture becomes homogeneous, after which the temperature can be raised to 30–40°. In the final stages of the reaction when the excess phosgene is being distilled, the temperature may be allowed to go to 60° but should not exceed 65°. In order to facilitate removal of excess phosgene and solvent, the pressure may be suitably reduced.

The practice of the invention is illustrated by the following example:

A reactor fitted with stirrer, thermometer and reflux condenser was charged with 19 grams (0.164 m.) of trans.-1,4-cyclohexanediol (quinitol), 170 grams of liquid phosgene and 250 milliliters of acetone, all being at about 5° C. While being stirred continuously, the mixture was warmed to 10–20°. After 1.5 hours the mixture became homogeneous, after which it was warmed to 35° and the acetone and excess phosgene were removed by distillation, vacuum being applied as needed to maintain distillation. The solid residue (46 grams) was recrystallized from absolute ether to yield 28 grams (71 percent) of quinitol bis-chloroformate having melting point 113.3–114.3° C. A second crop of 10 grams of crystals raised the yield to 96 percent.

Substantially similar results are obtained when the cis-isomer is used instead of the trans-quinitol used above.

The acetone used as the solvent in the above example can be replaced with any other lower saturated acyclic aliphatic ketone containing up to six carbon atoms, such as methyl ethyl ketone, methyl isobutyl ketone, diethyl ketone and the like.

I claim:

1. A process for producing quinitol bis-chloroformate comprising mixing one molar equivalent of trans-quinitol and at least about 3 molar equivalents of phosgene with at least an equal volume of a saturated, acyclic, aliphatic ketone containing 3 to 6 carbon atoms, maintaining the temperature of the mixture at about 0 to 65° C. until substantial reaction has occurred and recovering the thus formed quinitol bis-chloroformate from the mixture.

2. A process as defined in claim 1 wherein the ketone is acetone.

3. A process as defined in claim 1 wherein the temperature of the mixture is maintained at about 5 to 35° C. for about 1 to 2 hours.

References Cited in the file of this patent

UNITED STATES PATENTS 2,370,570    Muskat    Feb. 27, 1945

OTHER REFERENCES

Rabjohn: J.A.C.S., vol. 70 (March 1948), p. 1181.
Rabjohn et al.: J.A.C.S., vol. 74 (July 1952), p. 3216.
Wagner and Zook: "Synthetic Organic Chemistry," 1953, p. 483.